United States Patent [19]

Castanien et al.

[11] 4,306,500
[45] Dec. 22, 1981

[54] OPTICAL BACKSCATTER REDUCTION TECHNIQUE

[75] Inventors: Rodney L. Castanien, West Covina; Lee G. Young, Rancho Cucamonga, both of Calif.

[73] Assignee: General Dynamics, Pomona Division, Pomona, Calif.

[21] Appl. No.: 939,622

[22] Filed: Sep. 5, 1978

[51] Int. Cl.³ .................. F42C 13/02; H01J 40/14
[52] U.S. Cl. .................................. 102/213; 102/214; 250/214 B; 343/7 PF; 356/4
[58] Field of Search ............... 356/1, 4; 343/7 PF; 102/213, 214; 250/214 B

[56] References Cited
U.S. PATENT DOCUMENTS 2,560,265 7/1951 Adler, Jr. .................. 343/112 CA
2,925,965 2/1960 Pierce ............................ 102/213
3,413,633 11/1968 Lehmann ........................ 343/10
3,531,803 9/1970 Rosen et al. .
3,793,958 2/1974 Holt et al. ...................... 102/213
3,913,485 10/1975 Holmes et al. ............... 102/70.2 P
4,005,414 1/1977 Goggins, Jr. ................... 343/5 SA Primary Examiner—S. C. Buczinski
Attorney, Agent, or Firm—Henry M. Bissell; Edward B. Johnson

[57] ABSTRACT

An active optical target detecting device is provided for a missile. A transmitter radiates within the optical spectrum. This radiation is subject to scattering by water droplets in the atmosphere which may be due to clouds, fog, rain or other adverse weather conditions. In order to improve the signal-to-noise ratio two receivers that are associated with each transmitter are angularly displaced by equal angles from the transmitter. Hence, each receiver receives only one half of the undesirable backscatter radiation. Therefore, the target may be more readily detected even in the presence of backscatter.

8 Claims, 4 Drawing Figures

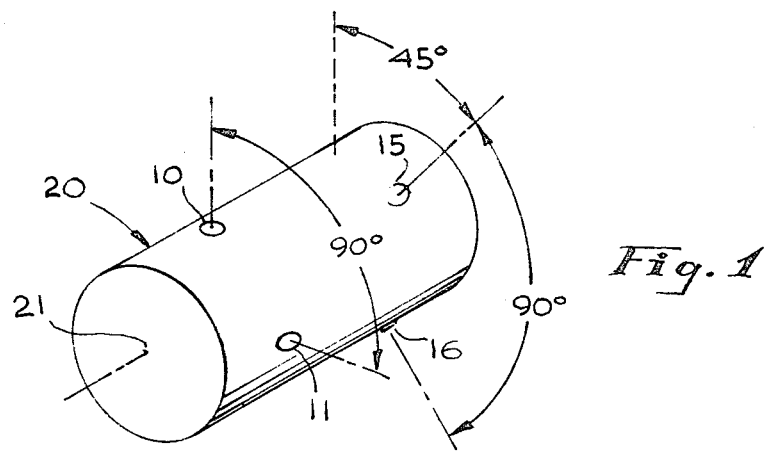
Fig. 1
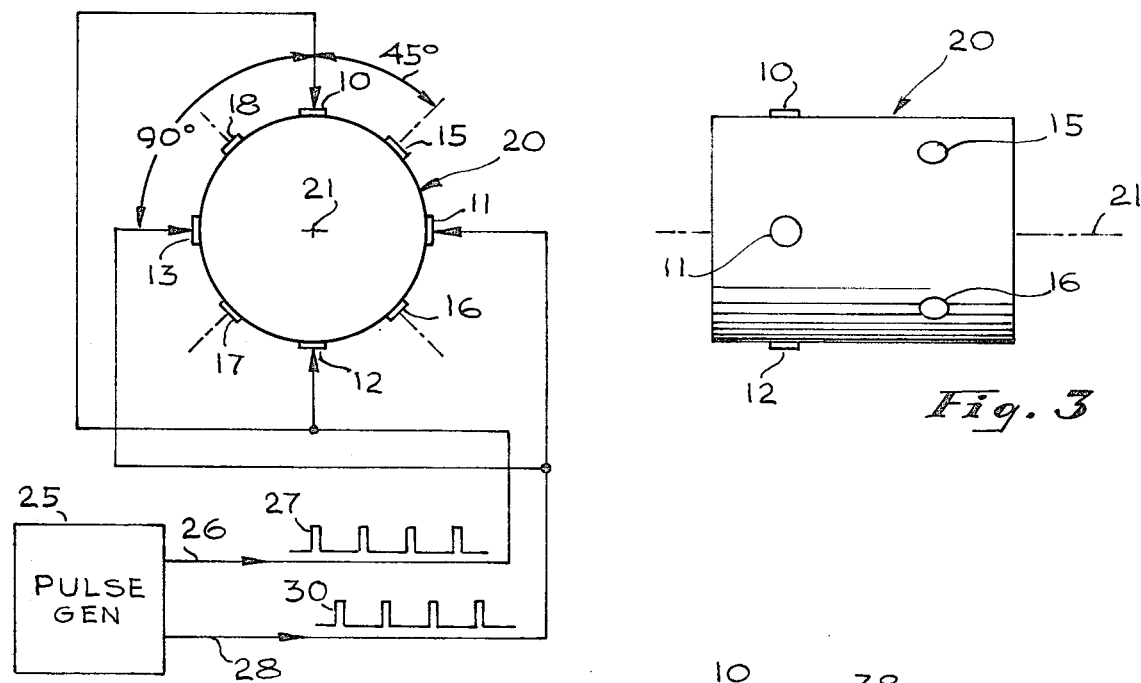
Fig. 2
Fig. 3
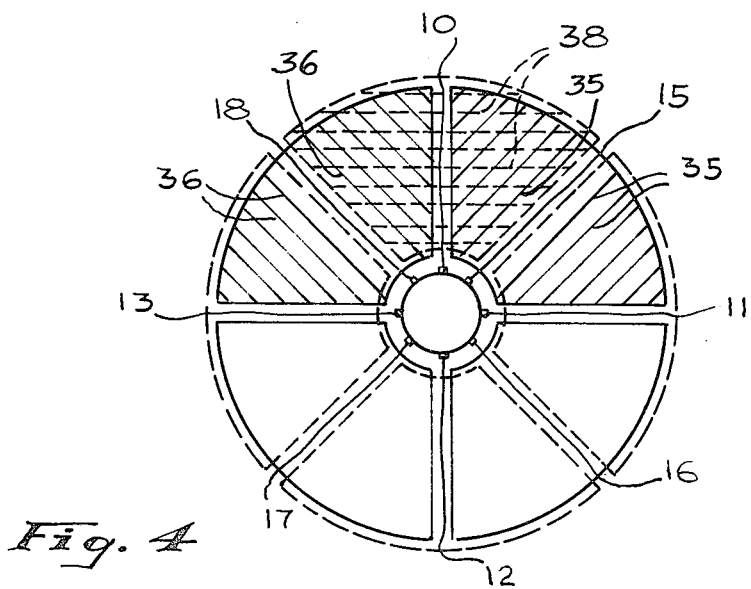
Fig. 4

OPTICAL BACKSCATTER REDUCTION TECHNIQUE

BACKGROUND OF THE INVENTION

1. Field of the Invention

This invention relates generally to target detecting devices for missiles and particularly relates to an active optical target detector including means for minimizing the adverse effects of backscatter of optical radiation.

2. Description of the Prior Art

It is well known that every missile is provided with a target detecting device. Such a device will detect a target and identify the closest approach by the missile to the target. When this occurs, the detector will generate a signal which causes the warhead of the missile to detonate. If at that time the missile is close enough to the target, the target will be destroyed.

A particular form of target detector is an active optical target detecting device. It consists of one or more sets of transmitters and receivers operating in the optical spectrum, which may be defined as radiation having a wavelength between approximately 0.2 micron and approximately 15 microns, one micron being one millionth of a meter.

Optical radiation in this range is subject to scattering by small particles or droplets found in the atmosphere. Such water droplets may be formed by rain or fog. These particles will scatter or reflect optical radiation depending on the particle size and the wavelength of the radiation. A receiver or receivers associated with the transmitter will pick up the so-called backscatter which represents noise. This noise in turn may swamp the desired signal which is the radiation reflected by a target.

A method has been proposed in the patent to Goggins, Jr., 4,005,414, for reducing the effects of radar backscatter. It has been found that the backscatter is a function of the polarization of the radar signals. Hence, it is proposed to transmit circularly polarized signals and to receive return signals which are linearly polarized. This in turn makes it possible to determine the major axis of the target.

The patent to Lehmann, U.S. Pat. No. 3,413,633, describes a method for searching for targets in space; that is, for detecting celestial bodies. To this end electromagnetic waves at a frequency near 100 mHz are transmitted. These waves are swept across a predetermined portion of space.

The patent to Rosen et al., U.S. Pat. No. 3,531,803, discloses apparatus for despinning an antenna beam from a spinning body. The antenna includes an array of waveguides carried by the spinning spacecraft. Hence, the radiated frequency is in the microwave region. In order to eliminate the effects of the spin, the waveguides are sequentially energized so as to direct a beam in a predetermined direction. The patent only discloses a transmitter and not a receiver.

The patent to Holmes et al., U.S. Pat. No. 3,913,485, is directed to an active/passive fuzing system. The energy transmitted is in the radio frequency energy region. A single transmitter and two receivers are simultaneously operated to provide a fuzing system which is effective in spite of any countermeasures and other interfering signals.

SUMMARY OF THE INVENTION

In accordance with the present invention there is provided an active optical target detecting device for a missile. The detecting device comprises at least one transmitter radiating within a predetermined range of the optical spectrum for detecting a target. The optical spectrum may be defined as being in the range of approximately 0.2 micron to approximately 15 microns. Further, at least two optical receivers are provided which are responsive to the radiation transmitted by the transmitter.

The transmitter and receivers are disposed on the surface of a cylinder. The receivers are disposed in a plane normal to the longitudinal axis of the cylinder. This plane is spaced from a plane passing through the transmitter and normal to the longitudinal axis. Furthermore, the planes passing through each receiver and along the longitudinal axis are disposed on both sides of and form substantially equal angles with, a plane passing through the transmitter and along the longitudinal axis. As a result, each of a pair of receivers associated with a transmitter will receive only one half of the backscatter of the transmitted radiation. This in turn will improve the signal-to-noise ratio and make it possible to detect a target, even under adverse weather conditions.

Preferably four transmitters and four receivers are provided, in which case each pair of receivers forms an angle of 45° between its plane passing along the longitudinal axis and a similar plane passing through the associated transmitter.

Furthermore, when, for example, four transmitters are provided, each associated pair of transmitters may be caused to radiate during a first period of time while the second pair of transmitters may be caused to radiate at a different period of time. It will, of course, be understood that more than two pairs of transmitters may be provided such, for example, as four pairs of transmitters.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

BRIEF DESCRIPTION OF THE DRAWINGS

FIG. 1 is a view in perspective illustrating, by way of example, a preferred embodiment of the invention having four transmitters and four receivers, the receivers being angularly displaced with respect to the transmitters;

FIG. 2 is an end elevational view of the optical target detecting device of FIG. 1 and including means for alternately emerging the pairs of transmitters;

FIG. 3 is a side elevational view of the detecting device of FIG. 1; and

FIG. 4 is a schematic view for illustrating the radiation received by one pair of receivers associated with a transmitter disposed between the receivers.

DESCRIPTION OF THE PREFERRED EMBODIMENT

Referring now to FIGS. 1–3, there is illustrated a preferred embodiment of the present invention. As clearly shown in FIG. 2, there are provided four transmitters 10, 11, 12 and 13. There is also provided a corresponding number of four receivers 15, 16, 17 and 18.

As clearly shown in FIGS. 1 and 2, the angular displacement between transmitters 10 and 13, for example, or 10 and 11, is 90°. On the other hand, the angular displacement, for example, between transmitter 10 and receiver 15 is 45°. Receivers 15 and 16 are separated by 90°. Thus, as clearly shown in FIGS. 1 and 3, all transmitters 10–13 are disposed in a single plane and on the surface of a cylinder 20, this plane being normal to the longitudinal axis 21 of the cylinder 20. Similarly, all receivers 15–18 are disposed on a similar plane intersecting the surface of cylinder 20 and normal to the longitudinal axis 21. These two planes are spaced from each other, as clearly shown in FIGS. 1 and 3.

The angular displacement between transmitters and receivers may be defined in the following manner. The two receivers 15 and 18 may be considered to be associated with the transmitter 10. Hence, a plane passing through transmitter 10 and along the longitudinal axis 21 will form two equal angles of 45° with the two planes passing respectively through receivers 15 and 18, and along the longitudinal axis 21.

It will be understood that the number of transmitters is arbitrary. Hence, instead of having two pairs of transmitters, 10, 12 and 11, 13, it may be feasible to have only a single pair or alternatively four pairs of transmitters and receivers may be provided. In the latter case, and with an equal number of receivers, that is, of eight receivers, the angle of separation between each transmitter and each receiver of an associated pair will be 22.5°. It is also feasible to provide a single transmitter, such as 10 and two associated receivers 15, 18.

Preferably, but not necessarily, pairs of associated transmitters such as 10, 12 and 11, 13 may be caused to radiate at different time intervals. For this purpose, there may, for example, be provided a pulse generator 25, as shown in FIG. 2. The generator 25 may have an output lead 26 for generating pulses 27 which are regularly spaced from each other. Lead 26 may be connected to transmitters 10 and 12. Pulse generator 25 may have another output lead 28 for generating another set of pulses 30 which are equally spaced from each other and which occur at times different from the occurrences of pulses 27 for causing the other pair of transmitters 11 and 13 to radiate at time intervals different from those when transmitters 10 and 12 radiate. To this end, the output lead 28 may be connected to transmitters 11 and 13.

The effects of this angular displacement of each pair of receivers, such as 15 and 18, with respect to an associated transmitter, such as 10, have been illustrated in FIG. 4. Thus, the slanted lines 35 illustrate the field of view of the receiver 15. Similarly, the lines 36, slanted in the opposite direction, illustrate the field of view of receiver 18. The horizontal broken lines 38 indicate the quadrant illuminated by the transmitter 10 and its possible reflection or backscatter as viewed by the two associated receivers 15 and 18.

From this representation of FIG. 4, it will be evident that each of the receivers 15 and 18 receives only one-half of the reflected or scattered beam coverage of transmitter 10. This, of course, means that each of the two receivers 15 and 18 receives also only one-half of the undesirable backscatter. The result is an improvement of the signal-to-noise ratio of two to one.

It will be evident that similar conditions obtain for the radiation radiated by transmitter 12. Since only two of the transmitters radiate at the same time, it will now be evident that each of the four receivers receives at any one time only one-half of the backscatter of its associated transmitter which is radiating at that time. When the other two transmitters 11 and 13 are caused to radiate, a similar situation will exist with respect to, say, the associated pair of receivers 15, 16 or 17, 18.

In summary, each transmitter radiates a pulse and the two receivers associated with that transmitter each receive one-half of the reflected energy. In the absence of a target in the field of view of that transmitter, only backscatter, as from clouds or similar atmospheric obstruction, is received, and then only one-half at each receiver. However, when a target is present, its reflection will be received by only one of the receivers (except in the most exceptional circumstances, and then only for an extremely limited period of time, as for a few pulse intervals) because its lateral extent is limited by its size, normally less than 1° of azimuth. Thus one of the receivers associated with the pulse transmitter receives only noise and no signal. The other receiver picks up the signal in the presence of its backscatter noise, but that noise is only one-half of the noise it would receive if it were in line with the transmitter. With the noise reduced by one-half, the signal/noise ratio is improved correspondingly.

For the arrangement of FIG. 4 in which four transmitters and four receivers are shown, each transmitter is arranged to radiate through a sector of only 90° (as indicated in the figure). Similarly, each receiver is arranged to receive reflected radiation through a 90° sector.

There has thus been disclosed an active optical target detecting device for a missile. Two optical receivers are associated with each transmitter radiating within a predetermined range of the optical spectrum. Because the receivers are angularly displaced from the associated transmitter, each receiver receives only half of the reflected or scattered radiation of the beam radiated by the transmitter. Hence, only one-half of the backscatter is received by each receiver with a corresponding improvement of the signal-to-noise ratio for detecting a target. Preferably, but not necessarily, the transmitters are caused to radiate alternately in pairs.

Although there have been described above specific arrangements of an optical backscatter reduction technique and methods of operating same in accordance with the invention for the purpose of illustrating the manner in which the invention may be used to advantage, it will be appreciated that the invention is not limited thereto.

Accordingly, any and all modifications, variations or equivalent arrangements which may occur to those skilled in the art should be considered to be within the scope of the invention as defined in the appended claims.

What is claimed is:

1. In a missile, an active optical target detecting device comprising:
   at least one transmitter capable of radiating within a predetermined range of the optical spectrum for detecting a target; and
   at least two optical receivers responsive to the radiation transmitted by said transmitter, said transmitter and said receivers being disposed relative to the surface of a cylinder having a longitudinal axis, said receivers being disposed in a plane normal to said longitudinal axis, said plane being spaced from a plane passing through the transmitter and normal to said longitudinal axis, other planes passing through the respective receivers and along said longitudinal axis being disposed on both sides of, and forming substantially equal angles with, a plane passing through said transmitter and along said longitudinal axis, whereby the undesirable effects of backscattering of the optical radiation of said transmitter by droplets in the atmosphere are minimized.

2. A target detecting device as defined in claim 1 wherein an equal number of transmitters and receivers is provided, and wherein at least two transmitters are disposed on opposite sides of said cylinder in a plane passing through said transmitters and along said longitudinal axis.

3. In a missile, an active optical target detecting device comprising:
   an even number of transmitters for transmitting radiation within a predetermined range of the optical spectrum and for detecting a target;
   a number of receivers equal to that of said transmitters for receiving the optical radiation transmitted by said transmitters and reflected from a target, said transmitters and receivers being disposed relative to the surface of a cylinder having a longitudinal axis, said transmitters being disposed in a plane intersecting said transmitters normal to and said longitudinal axis, said receivers being disposed in another plane passing through said receivers and said longitudinal axis, said planes being spaced from each other, other planes passing through respective pairs of receivers and normal to along said longitudinal axis forming equal angles with a plane passing through an associated pair of transmitters and along said longitudinal axis, whereby the adverse effects of the backscattering of the optical radiation from droplets in the atmosphere with respect to reflected target energy is minimized.

4. A target detecting device as defined in claim 3 wherein two pairs of transmitters and two pairs of receivers are provided, the planes along said longitudinal axis passing respectively through an associated pair of receivers and through an associated transmitter forming an angle of 45° therebetween.

5. A target detecting device as defined in claim 3 wherein said transmitters radiate a predetermined wavelength within the optical spectrum from approximately 0.2 micron to approximately 15 microns.

6. A target detecting device as defined in claim 4 wherein means are provided for causing a first pair of transmitters disposed in a plane intersecting said longitudinal axis to radiate during a first period of time and for causing a second pair of transmitters disposed in a plane intersecting said longitudinal axis to radiate during a second, different period of time.

7. A method of reducing the undesired effects of backscattering in an active optical target detecting system including at least one transmitter and including two receivers angularly displaced from the transmitter and located on opposite sides of the transmitter so as to receive radiation in respective discrete sectors, said method comprising the steps of:
   radiating from the transmitter into both of said discrete sectors a pulsed beam within a predetermined range of the optical spectrum for detecting a target; and
   detecting by means of each of the receivers approximately one-half of the backscattered radiation that would have been received if the receivers were in the same angular position as a transmitter, whereby each receiver receives one-half of the backscattered radiation but only one receiver receives radiation reflected from a target in one of said sectors, thereby to improve the signal-to-noise ratio for radiation reflected by a target.

8. The method of claim 7 wherein the system includes a plurality of transmitters and pairs of receivers respectively associated therewith, further comprising the steps of:
   pulsing the transmitters in different phase sequences; and
   receiving the reflected pulsed radiation in the receivers associated with each transmitter, thereby reducing interference from radiation backscatter.

* * * * *